July 15, 1941. R. J. ERNST 2,249,720
CONVEYER LINK
Filed April 28, 1941
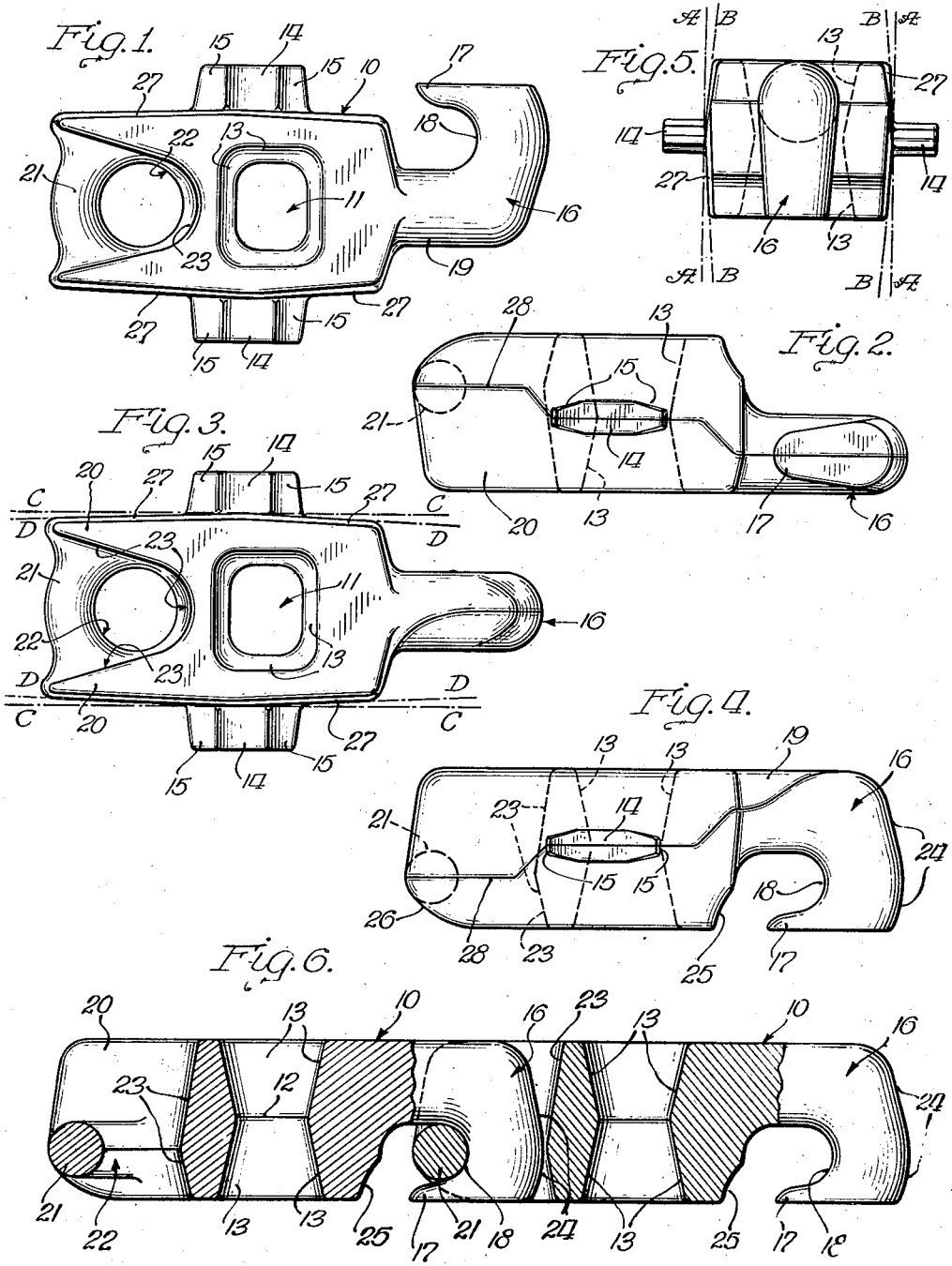
INVENTOR.
Robert J. Ernst
BY Patented July 15, 1941

2,249,720

UNITED STATES PATENT OFFICE 2,249,720

CONVEYER LINK

Robert J. Ernst, Chicago, Ill., assignor to Cherry-Burrell Corporation, Chicago, Ill., a corporation Application April 28, 1941, Serial No. 390,640

7 Claims. (Cl. 59—35)

This invention relates to new and useful improvements in methods for manufacturing conveyer chain links. More particularly this invention relates to improvements in methods for die-forging links for conveyer chains of great tensile strength and adapted to be propelled by sprocket wheels along conveyer chain guideways.

This application is a continuation in part of United States application Serial No. 322,878, filed March 8, 1940, and entitled "Chain conveyer."

It is of prime importance, in endless conveyer chains of the type in which chain links involving the present invention are adaptable, that the individual links be of great strength, present suitable load-engaging surfaces and yet be comparatively light in weight. It is also desirable that any individual link in a chain be readily replaced by another link or links with the least possible effort, thereby enabling the easy lengthening or shortening of the conveyer chain at will.

Substantially rectangularly shaped link bodies are provided with co-acting ball and socket, or hook and eye, or clevis joining means in conveyer chains of the general type contemplated by this invention in which the various structural features of the individual links are so arranged as to secure the desired friction for the conveyed load and also to permit ready assembly and disassembly of the links to form a chain as well as to adapt the conveyer chain for use in sharply curved tracks.

Such links so provided with the above type of generally readily detachable joining means are usually made by casting the blanks for the body portions of the links and then machining these blanks to provide the finished links. Frequently the clevis type of joining arrangements is of a permanent nature, the clevis pins being welded into place, which prevents the easy lengthening or shortening of the chain, or the easy replacement of worn or broken links.

The type of link which requires that the hook or eye on each must be at an angle to the other to permit the joining of the hook of one link with the eye of another and the ready swiveling of the hook in the eye when so joined is normally made by casting. The hook or eye in some instances is attached to the body portion of the link by welding it thereto. Either of these processes is costly and may result in defective links as well as links of reduced tensile strength.

It is, therefore, the object of this invention to provide an inexpensive method for making sanitarily constructed conveyer chain links of great tensile strength, hardness and resistance to abrasion by drop-forging the same in dies, in which method the links are provided with hook and eye gyratory joining means; in which the links are of substantially uniform tensile strength throughout any cross section; in which the die-forged links are provided with hook and eye joining means angularly arranged with respect to one another; in which the forged links are provided with suitable sprocket teeth engaging means to assure quiet operation; in which the forged links are all of substantially equal dimensions in all respects to permit their ready interchange one with another in a conveyer chain; and in which the completed link is substantially work-hardened in the die-forging operation.

The foregoing and other objectives and advantages of the present invention will become more apparent during the course of the following description when read with reference to the accompanying drawing, in which:

Figure 1 is a plan view of a die-forged link of the hook and eye type partially processed according to the improved method of the present invention.

Figure 2 is a side elevational view of the link shown in Figure 1.

Figure 3 is a plan view of a die-forged link of the hook and eye type which has been completely processed according to the method of the present invention.

Figure 4 is a side elevational view of the link shown in Figure 3.

Figure 5 is an end elevational view taken from the hook end of the link shown in Figure 3.

Figure 6 is a side elevational view, partially in broken-away section, of two completely forged links of the type shown in Figure 3.

Referring to the drawing, in which like numerals are used to identify like elements, reference numeral 10 represents generally the substantially rectangular link body portion having a centrally located aperture generally identified by the reference numeral 11. The aperture 11 is provided with a restricted mid-portion 12 and outwardly opening walls 13 which provide the necessary draft for the die-forging operation as well as for the engagement of the walls of the teeth of a sprocket wheel (not shown) when used in driving engagement with a conveyer chain made of the improved links.

The body portion 10 is provided on either side with transversely extending conveyer track engaging fins 14 provided with leading and trailing beveled edges 15. The front end of the body portion 10 is provided or terminates in a hook element generally indicated by the reference numeral 16. The hook 16 is formed integrally with the body portion 10 and includes a nose portion 17, a curved bite portion 18 and a shank portion 19 which joins the hook to the body portion 10 of the chain link.

The rear portion of the link body 10 is provided with two rearwardly extending vanes 20 and a cross bar 21 joining the rear portions of the vanes 20 slightly below their mid-sections. The cross bar 21 provides a bite element adapted to co-act with the complementary bite element in the hook 16. The vanes 20, cross bar 21 and rear portion of the link body 10 are provided with complementary curved or arcuate portions to form the substantially circular eye generally indicated by the numeral 22.

The cross bar 21 is substantially circular in cross section and in substance comprises an arcuate element, as clearly shown by Figures 3 and 6. The diameter of the cross section of the cross bar 21 is slightly less than the inner diameter of the curved bite portion 18 of the hook 16, as clearly shown in Figure 6. The diameter of the eye 22 is slightly larger than the diameter of the cross section of the curved bite portion 18 of the hook 16, as is also clearly shown in Figure 6.

The rear portions of the link body 10 and the vanes 20, which are combined to form a portion of the eye 22, are provided with outwardly opening arcuate walls 23 which open outwardly in both directions from the plane of the cross bar 21 and which, in addition to providing the necessary draft for the die-forging of the improved chain link, also assure the avoidance of binding between the leading but rearwardly inclined front edge 24 of the hook 16 and the arcuate walls 23.

The lower face of the nose 17 of the hook 16 is substantially flush with the lower face of the body portion 10 of the chain link. A concave, beveled edge 25 is provided at the lower leading portion of the link body 10 to enable the insertion of the hook 16 into the eye 22. The distance between the concave, beveled portion 25 and the adjacent end 17 of the hook 16 is slightly in excess of the diameter of the cross bar 21. The curvature of the concave, beveled element 25 is substantially the same and complementary to the curvature of the lower rear edge 26 of the vanes 20. The hook 16 of one link may be engaged with the eye 22 of an adjacent link by placing the complementary surfaces 25 and 26 in engagement and, when so engaged, the two links may be brought into alinement, as shown in Figure 6.

The outer walls 27 of the body 10 of the improved link and of the vanes 20 are inclined upwardly and inwardly above the dividing line 28 of the forging die (not shown) and downwardly and inwardly below said dividing line, all as clearly shown in Figure 5 and as indicated by the angle between the slope lines A and B. The same walls 27, in like manner, are inclined inwardly from the central portion of the link 20, both in a rearwardly and a forwardly direction, as is clearly indicated by the angle between the slope lines C and D disclosed in Figure 3. The compound inclination of the walls 27, as just described, besides providing for the necessary draft to facilitate the expeditious die-forging of the improved chain link, also provides the link with bowed or somewhat rounded outer walls, which construction permits the use of the link in narrow, curved chain tracks in which the fins 14 engage stabilizing grooves when negotiating sharp curves or corners in a conveyer provided with a conveyer chain comprised of the improved links.

The inclined walls 13 in the aperture 11, in like manner, provide the necessary draft to facilitate the die-forging of the apertured link body and the satisfactory driving of the chain by the use of an energized sprocket wheel (not shown), the sprockets of which engage the re-entry opening 11 in the link body 10. A sanitarily constructed link is also achieved by providing the link body 10 with sprocket engaging means, i. e., the aperture 11 which extends entirely through the link body 10. Similarly, the rounded cross sections of the elements of the hook 16 and the cross bar 21 also provide the necessary draft to facilitate the die-forging of the hook and eye portions of the improved link.

A series of forming, shearing, bending and gauging dies is used in sequence in the die-forging of the improved link which is carried on by the drop-forging process. A quantity of metal of the necessary cubic content slightly in excess of the cubic content of the cavities of the dies is heated to the desired forging temperature. The heated piece of metal is then placed in the forging dies and the print is made thereon in the usual manner by closing the dies. Having made the print of the improved link in the hot metal from which the link is to be formed, the dies are then further closed to make the impression of the link. Having made the impression of the link in the metal stock, the dies are then closed to completely forge the link, causing the hot metal to flow into all of the cavities of the sectional dies until all the cavities are entirely filled and the excess metal is forced out along the lines of juncture of the upper and lower sections of the dies. These lines are generally indicated in Figure 2 by the reference numeral 28.

The forged link made in the manner as just described is provided with a hook and eye portion, as shown in Figure 1, in which the hook 16 is in a plane parallel to the plane of the cross bar 21 which defines the major portion of the eye 22. While the forged link is still at forging temperature it is removed from the forging dies and placed in trimming dies and, while still at forging temperature, the excess metal, which is forced out from the die cavities along the sectional diejoining line 28 to form a flange or feather edge, is sheared off.

The sheared or trimmed link is then placed in a twisting or tong die, the stationary element of which grips the body portion 10 of the improved link and the tong portion of which grips the hook 16 of the link. At the time the forged link is placed in the twisting or tong die it is substantially in the shape as shown in Figures 1 and 2. The hook 16 in the tong die is twisted through an arc of ninety degrees until it is in a plane perpendicular to the plane of the eye 22, as shown in Figures 3, 4, 5 and 6. This twisting operation of the link, which is carried on while the link is still at forging temperature, tends to lengthen the shank portion 19 of the link.

When it is desired to re-establish the dimensions of the twisted portions of the link substantially as originally forged, the link, after the hook portion 16 has been twisted through an arc of ninety degrees in the twisting tongs, is gauged while at a forging temperature in gauge dies which are provided with faces complementary to the faces of the link body 10 and with inclined faces complementary to the faces 24 of the completed link. When the gauge dies are closed, said inclined faces thereof tend to upset the shank portion 19 of the twisted link 16 until the complete link, including the body portion, the eye portion and the hook portion, can be satisfactorily placed in the gauge dies.

All of the above operations, the forging which involves the making of the print, the impression and the complete forging of the link in the forging dies, the hot trimming or shearing of the feather edges or flanges of the excess metal from the walls of the link, the twisting of the hook portion in the tong dies and the gauging of the completed link in the gauge dies, are carried out while the metal of the link is in a plastic stage or at a forging heat. Following the gauging of the completed links in the gauge dies, the links are then heat treated, quenched and subsequently drawn or annealed to the desired hardness, such, for example, as 400 Brinnell hardness which is the desired hardness for the type of steel used in the preferred embodiment of the present invention.

In the preferred embodiment of the present invention the links are preferably made of electric furnace, cold-melt, fine grain, manganese, forged quality steel. This type of steel is readily work-hardened in the die-forging operations, as previously described, and enables the making of a very durable link of great tensile strength possessing great wearing qualities.

The foregoing described improvements in methods of making conveyer chain links of the hook and eye type in which the engaged hooks and eyes are angularly arranged with respect to one another to permit the ready swiveling in all directions provide a means for the inexpensive production by die-forging operations of a link of great tensile strength which, due to the foregoing improved process, is provided with structural characteristics not heretofore possible by die-forging operations. The improved link may also be work-hardened incidental to the die-forging operations by the selection of materials which are susceptible to work-hardening.

Although the invention has been primarily described with respect to the preferred embodiment thereof, various modifications of the invention will be readily apparent to those skilled in the art. The scope of the present invention is, however, not to be restricted except in so far as necessitated by the prior art and the spirit of the appended claims.

The invention is hereby claimed as follows:

1. The method of making a chain link which comprises the steps of die-forging a link body having a hook portion at one end and a hook engaging portion at the opposite end, said die-forged link body having said hook and hook engaging portions in parallel planes, and deforming said hook portion until it is angularly arranged with respect to the plane of said hook engaging portion.

2. The method of die-forging a metal chain link which comprises the steps of die-forging a link body having a hook portion at one end and a hook engaging portion at the opposite end, and twisting said hook portion in twisting dies until it is angularly arranged with respect to the plane of said hook engaging portion, said forging and twisting operations being performed while the metal of said link is in a plastic stage.

3. The method of making a chain link including hook and eye means which comprises the steps of subjecting a suitable quantity of material to external pressure between die blocks, causing the flow of the material into the die openings to form a link body having hook means and eye means formed integrally therewith at opposite ends thereof, and flexing one of said means into angular position with respect to the other of said means.

4. The method of constructing a chain link which comprises the steps of die-forging a link into partially completed form from material when in plastic condition, and while the material is plastic twisting one portion of the link with respect to the remaining portion of the link in a second die-forging operation.

5. The method of making a chain link including gyratory link joining means which comprises the steps of work-hardening a metal link blank while die-forging the link, said metal blank being heated to a forging heat, and twisting one portion of the forged link with respect to the remaining portion of the link in tong dies to limit the deforming of the plastic metal of the link to a predetermined portion of the link.

6. The method of constructing a chain link having integrally formed hook and eye means which comprises shaping a link from metal at forging heat in forging dies, shearing the excess metal from said die-forged link in shearing dies while the link is at a forging heat, twisting the hook portion of the link in tong dies into angular relation with respect to the eye portion of the link while the link is at a forging heat, gauging the link in gauging dies while the link is at a forging heat, work-hardening the link in all of said die operations, tempering the link after said forging, shearing, twisting and gauging operations, and annealing the tempered link to the desired hardness.

7. The method of making a conveyor chain of links, each having a central body portion terminating in a hook at one end angularly disposed with respect to a hook engaging means at the opposite end, which comprises the steps of die-forging a link from metal while the metal is in a plastic stage, said forged link having the hook and hook engaging means so positioned with respect to one another as to permit the opening of the dies and the withdrawal of the forged link from the dies without distorting any portion of the link, twisting the hook portion of the link into a plane angularly disposed with respect to the plane of the hook engaging portion of the link by the use of twisting tong dies while the metal is in a plastic stage, and then assembling said conveyor chain by joining the hooks of the links to be included in the chain with the hook engaging portions of adjacent links.

ROBERT J. ERNST.